United States Patent
Jia et al.

(10) Patent No.: US 11,184,928 B2
(45) Date of Patent: Nov. 23, 2021

(54) SYSTEM MESSAGE TRANSMISSION METHOD, RELATED DEVICE, AND COMMUNICATIONS SYSTEM

(71) Applicant: Huawei Technologies Co., Ltd., Shenzhen (CN)

(72) Inventors: Xiaoqian Jia, Shanghai (CN); Haiyan Luo, Shanghai (CN); Hongzhuo Zhang, Shanghai (CN); Li Yang, Reading (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/198,072

(22) Filed: Nov. 21, 2018

(65) Prior Publication Data
US 2019/0098670 A1   Mar. 28, 2019

Related U.S. Application Data

(63) Continuation of application No. PCT/CN2016/083553, filed on May 26, 2016.

(51) Int. Cl.
*H04W 74/08* (2009.01)
*H04W 48/20* (2009.01)
(Continued)

(52) U.S. Cl.
CPC ....... *H04W 74/0833* (2013.01); *H04W 48/08* (2013.01); *H04W 48/12* (2013.01);
(Continued)

(58) Field of Classification Search
CPC . H04W 74/0833; H04W 48/12; H04W 74/00; H04W 48/08; H04W 48/20; H04W 76/27
See application file for complete search history.

(56) References Cited

U.S. PATENT DOCUMENTS 10,455,621 B2 * 10/2019 Agiwal ............... H04W 4/06
2005/0143068 A1 * 6/2005 Ben-Yehuda ......... H04W 36/30
455/434
(Continued)

FOREIGN PATENT DOCUMENTS

CN    102625461 A    8/2012
CN    103906167 A    7/2014
(Continued)

OTHER PUBLICATIONS

3GPP TS 36.300 V13.3.0 (Mar. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 295 pages.
(Continued)

*Primary Examiner* — Hoang-Chuong Q Vu
(74) *Attorney, Agent, or Firm* — Slater Matsil, LLP

(57) ABSTRACT

A method includes: receiving, by a first access device, a random access message sent by user equipment; and sending, by the first access device, first system information to the user equipment based on the random access message, where the first system information includes cell reselection information related to the first access device. According to the present invention, cell reselection information can be transferred in a random access procedure.

18 Claims, 6 Drawing Sheets

(51) Int. Cl.
*H04W 76/27* (2018.01)
*H04W 48/08* (2009.01)
*H04W 74/00* (2009.01)
*H04W 48/12* (2009.01)

(52) U.S. Cl.
CPC ........... *H04W 48/20* (2013.01); *H04W 74/00* (2013.01); *H04W 76/27* (2018.02)

(56) References Cited

U.S. PATENT DOCUMENTS

| | | | | |
|---|---|---|---|---|
| 2008/0287129 | A1* | 11/2008 | Somasundaram | H04W 36/0055 455/436 |
| 2009/0061878 | A1* | 3/2009 | Fischer | H04L 47/263 455/436 |
| 2009/0274086 | A1* | 11/2009 | Petrovic | H04W 48/10 370/312 |
| 2011/0317617 | A1* | 12/2011 | Sun | H04B 7/155 370/315 |
| 2012/0015657 | A1* | 1/2012 | Comsa | H04W 52/0206 455/436 |
| 2012/0276933 | A1 | 11/2012 | Laitinen | |
| 2013/0039195 | A1* | 2/2013 | Weng | H04W 48/20 370/252 |
| 2013/0083753 | A1* | 4/2013 | Lee | H04L 1/0026 370/329 |
| 2014/0044029 | A1* | 2/2014 | Chou | H04W 52/0254 370/311 |
| 2014/0112254 | A1* | 4/2014 | Lindoff | H04W 74/002 370/328 |
| 2015/0280802 | A1* | 10/2015 | Thomas | H04L 27/2636 370/312 |
| 2015/0312887 | A1* | 10/2015 | Xia | H04W 72/005 370/329 |
| 2015/0319659 | A1* | 11/2015 | Jung | H04W 48/18 370/331 |
| 2015/0326356 | A1* | 11/2015 | Guan | H04L 5/005 370/330 |
| 2016/0112164 | A1 | 4/2016 | Worrall | |
| 2016/0219625 | A1* | 7/2016 | Lee | H04W 74/0833 |
| 2016/0234736 | A1* | 8/2016 | Kubota | H04L 12/18 |
| 2016/0255547 | A1 | 9/2016 | Wang et al. | |
| 2016/0353440 | A1* | 12/2016 | Lee | H04W 74/0833 |
| 2017/0311285 | A1* | 10/2017 | Ly | H04W 74/0833 |
| 2018/0041949 | A1* | 2/2018 | Liu | H04W 74/0833 |
| 2018/0063777 | A1* | 3/2018 | Muller | H04W 74/0833 |
| 2019/0150096 | A1* | 5/2019 | Lee | H04W 52/247 370/331 |

FOREIGN PATENT DOCUMENTS

| | | |
|---|---|---|
| EP | 2070366 B1 | 12/2015 |
| GN | 101860939 A | 10/2010 |
| GN | 102045685 A | 5/2011 |

OTHER PUBLICATIONS

3GPP TS 36.331 V13.1.0 (Mar. 2016), "3rd Generation Partnership Project;Technical Specification Group Radio Access Network; Evolved Universal Terrestrial Radio Access (E-UTRA); Radio Resource Control (RRC); Protocol specification (Release 13)", 551 pages.

R2-162300, Samsung, "Preliminary view on Initial Access in 5G", 3GPP TSG-RAN WG2 Meeting #93bis, Dubrovnik, Croatia, Apr. 11-15, 2016, 3 pages.

R2-163371, Samsung, "System Information Signalling Design in NR", 3GPP TSG-RAN WG2 Meeting #94, Nanjing, China, May 23-27, 2016, 7 pages.

IPWireless Inc., "Layer 1 signalling based counting method for E-MBMS", 3GPP TSG RAN WG2 #71, R2-104531, Madrid, Spain, Aug. 23-27, 2010, 10 pages.

* cited by examiner

SYSTEM MESSAGE TRANSMISSION METHOD, RELATED DEVICE, AND COMMUNICATIONS SYSTEM

CROSS-REFERENCE TO RELATED APPLICATIONS

This application is a continuation of International Application No. PCT/CN2016/083553, filed on May 26, 2016, the disclosure of which is hereby incorporated by reference in its entirety.

TECHNICAL FIELD

The present invention relates to the field of communications technologies, and in particular, to a system message transmission method, a related device, and a communications system.

BACKGROUND

In a long term evolution (LTE) network, user equipment (UE) needs to perform a network search procedure after power-on. The network search procedure is roughly as follows: finding an appropriate cell; determining, based on a system message of the cell, whether the cell meets a camping condition; and if the cell meets the camping condition, camping on the cell.

The system information includes a master information block (MIB) and a plurality of system information blocks (SIB). The plurality of SIBs include a SIB1 to a SIB8. The MIB, the SIB1 and the SIB2 include cell access information, and the MIB includes a relatively important system information parameter such as uplink system bandwidth, physical hybrid automatic repeat request indicator channel (PHICH) configuration information, or a system frame number (SFN). The SIB1 includes related information indicating whether the UE is allowed to camp on the cell, time-domain scheduling information of other SIBs, and the like. The SIB2 includes information indicating that the UE normally accesses the cell, including cell bandwidth, a random access parameter, and the like. The SIB3 to the SIB8 include intra-frequency and inter-frequency cell reselection information, related information about a neighboring cell (including an intra-frequency neighboring cell and an inter-frequency neighboring cell), and related information about a non-LTE cell such as Global System for Mobile communications (GSM), a Universal Mobile Telecommunications System (UMTS), a Wideband Code Division Multiple Access mobile (WCDMA) communications system, a Time Division-Synchronous Code Division Multiple Access (TD-SCDMA) communications system, or a high speed packet access (HSPA) communications system.

FIG. 1 is a schematic diagram of a system message transmission process in an existing LTE network. The transmission process includes the following steps:

S101: An evolved NodeB (eNB) in an LTE network sends a primary synchronization signal (PSS)/secondary synchronization signal (SSS) to UE, to implement downlink synchronization.

S102: The eNB periodically broadcasts a system message including a MIB, a SIB1, a SIB2, and other SIB information (including a SIB3 to a SIB8) to the UE.

S103: The UE completes cell reselection based on the SIB3 to the SIB8, and then camps on an appropriate cell.

S104: If the UE selects a current LTE cell to access, the UE sends a Msg1, namely, a random access preamble (Preamble) message, to the eNB, where the preamble message includes a random access preamble sequence selected by the UE.

S105: The eNB sends a Msg2, namely, a random access response message, to the UE.

S106: The UE sends a Msg3 to the eNB, that is, the UE sends a radio resource control (RRC) connection request message to the eNB.

S107: The eNB sends a Msg4, namely, an RRC connection setup complete message, to the UE.

In the prior art, the LTE eNB periodically broadcasts all system messages to the UE. After a new standard is introduced, how a new-standard base station sends system information to user equipment is a technical issue currently being discussed.

SUMMARY

Embodiments of the present invention provide a system message transmission method, a related device, and a communications system, so as to transfer cell reselection information in a random access procedure.

According to a first aspect, a system message transmission method is provided. The method includes: receiving, by a first access device, a random access message sent by user equipment; and sending, by the first access device, first system information to the user equipment based on the random access message, where the first system information includes cell reselection information related to the first access device.

By performing the foregoing steps, the first access device sends the cell reselection information related to the first access device to the user equipment in a random access procedure, so that the user equipment can perform cell reselection in a subsequent procedure.

With reference to the first aspect, in a first implementation of the first aspect, before the receiving, by a first access device, a random access message sent by user equipment, the method further includes: broadcasting, by the first access device, second system information to the user equipment, where the second system information does not include the cell reselection information but includes cell access information corresponding to the first access device.

By performing the foregoing step, when broadcasting the second system information, the first access device broadcasts only the cell access information corresponding to the first access device, and does not broadcast cell reselection information corresponding to the first access device and another access device. This not only can ensure that before performing a cell reselection procedure, the user equipment can obtain the cell reselection information by initiating the random access procedure to the first access device, but also can avoid causing unnecessary waste of system resources and save an air interface transmission resource.

With reference to the first aspect or the first implementation of the first aspect, in a second implementation of the first aspect, the random access message includes indication information used to indicate whether to obtain the first system information; and the sending, by the first access device, first system information to the user equipment based on the random access message includes: sending, by the first access device, the first system information to the user equipment based on the indication information.

By performing the foregoing step, the first access device determines, based on the indication information, to send the first system information to the user equipment.

With reference to the first aspect, the first implementation of the first aspect, or the second implementation of the first aspect, in a third implementation of the first aspect, the random access message includes a random access preamble message; and the sending first system information to the user equipment includes: carrying the first system information to a random access response message, and sending the random access response message to the user equipment.

By performing the foregoing step, the first access device may add the cell reselection information related to the first access device to the random access response message and send the random access response message to the user equipment in the random access procedure, instead of periodically broadcasting the cell reselection information. This avoids causing unnecessary waste of system resources.

With reference to the first aspect, the first implementation of the first aspect, or the second implementation of the first aspect, in a fourth implementation of the first aspect, the random access message includes a radio resource control (RRC) connection request message; and the sending first system information to the user equipment includes: carrying the first system information to an RRC connection setup complete message, and sending the RRC connection setup complete message to the user equipment.

By performing the foregoing step, the first access device may add the first system information to the RRC connection setup complete message and send the RRC connection setup complete message to the user equipment in the random access procedure, instead of periodically broadcasting the cell reselection information. This avoids causing unnecessary waste of system resources.

According to a second aspect, a system message transmission method is provided. The method includes: sending, by user equipment, a random access message to a first access device; and receiving, by the user equipment, first system information sent by the first access device, where the first system information includes cell reselection information related to the first access device.

By performing the foregoing steps, the user equipment initiates a random access procedure to the first access device, and receives, in the random access procedure, the cell reselection information related to the first access device that is sent by the first access device, so that the user equipment can perform cell reselection in a subsequent procedure.

With reference to the second aspect, in a first implementation of the second aspect, before the sending, by user equipment, a random access message to a first access device, the method further includes: receiving, by the user equipment, second system information broadcast by the first access device or the second access device, where the second system information does not include the cell reselection information but includes cell access information corresponding to the first access device, and the first access device is a neighboring-cell access device of the second access device.

By performing the foregoing step, the user equipment receives the cell access information corresponding to the first access device that is broadcast by the first access device or the second access device, and the system information broadcast by the first access device or the second access device does not include the cell reselection information related to the first access device. This not only can ensure that before performing a cell reselection procedure, the user equipment can obtain the cell reselection information by initiating the random access procedure to the first access device, but also can avoid causing unnecessary waste of system resources and save an air interface transmission resource.

With reference to the second aspect or the first implementation of the second aspect, in a second implementation of the second aspect, the random access message is a random access preamble message; and the receiving, by the user equipment, first system information sent by the first access device includes: receiving, by the user equipment, a random access response message that carries the first system information and that is sent by the first access device.

By performing the foregoing step, the user equipment may receive the random access response message that carries the cell reselection information related to the first access device and that is sent by the first access device, and the first access device does not periodically broadcast the cell reselection information. This avoids causing unnecessary waste of system resources.

With reference to the second aspect or the first implementation of the second aspect, in a third implementation of the second aspect, the random access message includes an RRC connection request message; and the receiving, by the user equipment, first system information sent by the first access device includes: receiving, by the user equipment, an RRC connection setup complete message that carries the first system information and that is sent by the first access device.

By performing the foregoing step, the user equipment may receive the RRC connection setup complete message that carries the cell reselection information related to the first access device and that is sent by the first access device, and the first access device does not periodically broadcast the cell reselection information. This avoids causing unnecessary waste of system resources.

According to a third aspect, an access device is provided. The access device is a first access device, the first access device includes a processor, a memory, and a communications module, the memory is configured to store program code for system message transmission, and the processor is configured to invoke the program code for system message transmission to perform the following operations: receiving, by the processor by using the communications module, a random access message sent by user equipment; and sending, by the processor, first system information to the user equipment based on the random access message by using the communications module, where the first system information includes cell reselection information related to the first access device.

By performing the foregoing operations, the first access device sends the cell reselection information related to the first access device to the user equipment in a random access procedure, so that the user equipment can perform cell reselection in a subsequent procedure.

With reference to the third aspect, in a first implementation of the third aspect, before the processor receives, by using the communications module, the random access message sent by the user equipment, the processor is further configured to: broadcast, by the processor, second system information to the user equipment by using the communications module, where the second system information does not include the cell reselection information but includes cell access information corresponding to the first access device.

By performing the foregoing operation, when broadcasting the system information, the first access device broadcasts only the cell access information corresponding to the first access device, and does not broadcast the cell reselection information related to the first access device. This not only can ensure that before performing a cell reselection procedure, the user equipment can obtain the cell reselection information by initiating a random access procedure to the first access device, but also can avoid causing unnecessary waste of system resources and save an air interface transmission resource.

With reference to the third aspect or the first implementation of the third aspect, in a second implementation of the third aspect, the random access message includes indication information used to indicate whether to obtain the first system information; and the sending, by the processor, first system information to the user equipment based on the random access message by using the communications module includes: sending, by the processor, the first system information to the user equipment based on the indication information by using the communications module.

By performing the foregoing operation, the first access device determines, based on the indication information, to send the first system information to the user equipment.

With reference to the third aspect, the first implementation of the first aspect, or the second implementation of the third aspect, in a third implementation of the third aspect, the random access message includes a random access preamble message; and the sending, by the processor, first system information to the user equipment by using the communications module includes: carrying, by the processor, the first system information to a random access response message, and sending the random access response message to the user equipment by using the communications module.

By performing the foregoing operation, the first access device may add the cell reselection information related to the first access device to the random access response message and send the random access response message to the user equipment in the random access procedure, instead of periodically broadcasting the cell reselection information. This avoids causing unnecessary waste of system resources.

With reference to the third aspect, the first implementation of the third aspect, or the second implementation of the third aspect, in a fourth implementation of the third aspect, the random access message includes an RRC connection request message; and the sending, by the processor, first system information to the user equipment by using the communications module includes: carrying, by the processor, the first system information to an RRC connection setup complete message, and sending the RRC connection setup complete message to the user equipment by using the communications module.

By performing the foregoing operation, the first access device may add the first system information to the RRC connection setup complete message and send the RRC connection setup complete message to the user equipment in the random access procedure, instead of periodically broadcasting the cell reselection information. This avoids causing unnecessary waste of system resources.

According to a fourth aspect, user equipment is provided. The user equipment includes a processor, a memory, and a communications module, the memory is configured to store program code for system message transmission, and the processor is configured to invoke the program code for system message transmission to perform the following operations: sending, by the processor, a random access message to a first access device by using the communications module; and receiving, by the processor by using the communications module, first system information sent by the first access device, where the first system information includes cell reselection information related to the first access device.

By performing the foregoing operations, the user equipment initiates a random access procedure to the first access device, and receives, in the random access procedure, the cell reselection information related to the first access device that is sent by the first access device, so that the user equipment can perform cell reselection in a subsequent procedure.

With reference to the fourth aspect, in a first implementation of the fourth aspect, before the processor sends the random access message to the first access device by using the communications module, the processor is further configured to: receive, by the processor by using the communications module, second system information broadcast by the first access device or the second access device, where the second system information does not include the cell reselection information but includes cell access information corresponding to the first access device, and the first access device is a neighboring-cell access device of the second access device.

By performing the foregoing operation, the user equipment receives the cell access information corresponding to the first access device that is broadcast by the first access device or the second access device, and the system information broadcast by the first access device or the second access device does not include the cell reselection information related to the first access device. This not only can ensure that before performing a cell reselection procedure, the user equipment can obtain the cell reselection information by initiating the random access procedure to the first access device, but also can avoid causing unnecessary waste of system resources and save an air interface transmission resource.

With reference to the fourth aspect or the first implementation of the fourth aspect, in a second implementation of the fourth aspect, the random access message is a random access preamble message; and the receiving, by the processor by using the communications module, first system information sent by the first access device includes: receiving, by the processor by using the communications module, a random access response message that carries the first system information and that is sent by the first access device.

By performing the foregoing operation, the user equipment may receive the random access response message that carries the cell reselection information related to the first access device and that is sent by the first access device, and the first access device does not periodically broadcast the cell reselection information. This avoids causing unnecessary waste of system resources.

With reference to the fourth aspect or the first implementation of the fourth aspect, in a third implementation of the fourth aspect, the random access message includes an RRC connection request message; and the receiving, by the processor by using the communications module, first system information sent by the first access device includes: receiving, by the processor by using the communications module, an RRC connection setup complete message that carries the first system information and that is sent by the first access device.

By performing the foregoing operation, the user equipment may receive the RRC connection setup complete message that carries the cell reselection information related to the first access device and that is sent by the first access device, and the first access device does not periodically broadcast the cell reselection information. This avoids causing unnecessary waste of system resources.

According to a fifth aspect, an access device is provided. The access device is a first access device, and the first access device includes a receiving unit and a sending unit, where the receiving unit is configured to receive a random access message sent by user equipment; and the sending unit is configured to send first system information to the user equipment based on the random access message, where the first system information includes cell reselection information related to the first access device.

By running the foregoing units, the first access device sends the cell reselection information related to the first access device to the user equipment in a random access procedure, so that the user equipment can perform cell reselection in a subsequent procedure.

With reference to the fifth aspect, in a first implementation of the fifth aspect, the first access device further includes: a broadcasting unit, configured to broadcast second system information to the user equipment, where the second system information does not include the cell reselection information but includes cell access information corresponding to the first access device.

By running the foregoing unit, when broadcasting the system information, the first access device broadcasts only the cell access information corresponding to the first access device, and does not broadcast cell reselection information corresponding to the first access device and another access device. This not only can ensure that before performing a cell reselection procedure, the user equipment can obtain the cell reselection information by initiating a random access procedure to the first access device, but also can avoid causing unnecessary waste of system resources and save an air interface transmission resource.

With reference to the fifth aspect or the first implementation of the fifth aspect, in a second implementation of the fifth aspect, the random access message includes indication information used to indicate whether to obtain the first system information; and the sending unit is specifically configured to: send the first system information to the user equipment based on the indication information.

By running the foregoing unit, the first access device determines, based on the indication information, to send the first system information to the user equipment.

With reference to the fifth aspect, the first implementation of the fifth aspect, or the second implementation of the fifth aspect, in a third implementation of the fifth aspect, the random access message includes a random access preamble message; and the sending unit is specifically configured to: add the first system information to a random access response message, and send the random access response message to the user equipment.

By running the foregoing unit, the first access device may add the cell reselection information related to the first access device to the random access response message and send the random access response message to the user equipment in the random access procedure, instead of periodically broadcasting the cell reselection information. This avoids causing unnecessary waste of system resources.

With reference to the fifth aspect, the first implementation of the fifth aspect, or the second implementation of the fifth aspect, in a fourth implementation of the fifth aspect, the random access message includes an RRC connection request message; and the sending unit is specifically configured to: add the first system information to an RRC connection setup complete message, and send the RRC connection setup complete message to the user equipment.

By running the foregoing unit, the first access device may add the first system information to the RRC connection setup complete message and send the RRC connection setup complete message to the user equipment in the random access procedure, instead of periodically broadcasting the cell reselection information. This avoids causing unnecessary waste of system resources.

The modules or units included in the first access device are not limited to the foregoing names.

According to a sixth aspect, user equipment is provided. The user equipment includes a sending unit and a first receiving unit, where the sending unit is configured to send a random access message to a first access device; and the first receiving unit is configured to receive first system information sent by the first access device, where the first system information includes cell reselection information related to the first access device.

By running the foregoing units, the user equipment initiates a random access procedure to the first access device, and receives, in the random access procedure, the cell reselection information related to the first access device that is sent by the first access device, so that the user equipment can perform cell reselection in a subsequent procedure.

With reference to the sixth aspect, in a first implementation of the sixth aspect, the user equipment further includes: a second receiving unit, configured to receive second system information broadcast by the first access device or the second access device, where the second system information does not include the cell reselection information but includes cell access information corresponding to the first access device, and the first access device is a neighboring-cell access device of the second access device.

By running the foregoing unit, the user equipment receives the cell access information corresponding to the first access device that is broadcast by the first access device or the second access device, and the system information broadcast by the first access device or the second access device does not include the cell reselection information related to the first access device. This not only can ensure that before performing a cell reselection procedure, the user equipment can obtain the cell reselection information by initiating the random access procedure to the first access device, but also can avoid causing unnecessary waste of system resources and save an air interface transmission resource.

With reference to the sixth aspect or the first implementation of the sixth aspect, in a second implementation of the sixth aspect, the random access message is a random access preamble message; and the first receiving unit is specifically configured to: receive a random access response message that carries the first system information and that is sent by the first access device.

By running the foregoing unit, the user equipment may receive the random access response message that carries the cell reselection information related to the first access device and that is sent by the first access device, and the first access device does not periodically broadcast the cell reselection information. This avoids causing unnecessary waste of system resources.

With reference to the sixth aspect or the first implementation of the sixth aspect, in a third implementation of the sixth aspect, the random access message includes an RRC connection request message; and the first receiving unit is specifically configured to: receive an RRC connection setup complete message that carries the first system information and that is sent by the first access device.

By running the foregoing unit, the user equipment may receive the RRC connection setup complete message that carries the cell reselection information related to the first access device and that is sent by the first access device, and the first access device does not periodically broadcast the cell reselection information. This avoids causing unnecessary waste of system resources.

The modules or units included in the user equipment are not limited to the foregoing names.

According to a seventh aspect, a communications system is provided. The communications system includes a first access device and user equipment, where the user equipment is configured to send a random access message to the first access device; and the first access device is configured to send first system information to the user equipment based on the random access message, where the first system information includes cell reselection information related to the first access device.

By performing the foregoing operations, the first access device sends the cell reselection information related to the first access device to the user equipment in a random access procedure, so that the user equipment can perform cell reselection in a subsequent procedure.

With reference to the seventh aspect, in a first implementation of the seventh aspect, before the user equipment is configured to send the random access message to the first access device, the user equipment is further configured to receive second system information broadcast by the first access device or a second access device, where the second system information does not include the cell reselection information but includes cell access information corresponding to the first access device, and the first access device is a neighboring-cell access device of the second access device.

By performing the foregoing operation, when broadcasting the system information, the first access device broadcasts only the cell access information corresponding to the first access device, and does not broadcast cell reselection information corresponding to the first access device and another access device. This not only can ensure that before performing a cell reselection procedure, the user equipment can obtain the cell reselection information by initiating a random access procedure to the first access device, but also can avoid causing unnecessary waste of system resources and save an air interface transmission resource.

With reference to the seventh aspect or the first implementation of the seventh aspect, in a second implementation of the seventh aspect, the random access message includes indication information used to indicate whether to obtain the first system information; and that the first access device is configured to send first system information to the user equipment based on the random access message is specifically: the first access device is configured to send the first system information to the user equipment based on the indication information.

By performing the foregoing operation, the first access device determines, based on the indication information, to send the first system information to the user equipment.

With reference to the seventh aspect, the first implementation of the seventh aspect, or the second implementation of the seventh aspect, in a third implementation of the seventh aspect, the random access message includes a random access preamble message; and that the first access device is configured to send first system information to the user equipment is specifically: the first access device is configured to: add the first system information to a random access response message, and send the random access response message to the user equipment.

By performing the foregoing operation, the first access device may add the cell reselection information related to the first access device to the random access response message and send the random access response message to the user equipment in the random access procedure, instead of periodically broadcasting the cell reselection information. This avoids causing unnecessary waste of system resources.

With reference to the seventh aspect, the first implementation of the seventh aspect, or the second implementation of the seventh aspect, in a fourth implementation of the seventh aspect, the random access message includes an RRC connection request message; and that the first access device is configured to send first system information to the user equipment is specifically: the first access device is configured to: add the first system information to an RRC connection setup complete message, and send the RRC connection setup complete message to the user equipment.

By performing the foregoing operation, the first access device may add the first system information to the RRC connection setup complete message and send the RRC connection setup complete message to the user equipment in the random access procedure, instead of periodically broadcasting the cell reselection information. This avoids causing unnecessary waste of system resources.

According to an eighth aspect, a communications system is provided. The communications system includes a first access device, a second access device, and user equipment, where the user equipment is configured to send a random access message to the first access device; and the first access device is configured to send first system information to the user equipment based on the random access message, where the first system information includes cell reselection information related to the first access device.

By performing the foregoing operations, the first access device sends the cell reselection information related to the first access device to the user equipment in a random access procedure, so that the user equipment can perform cell reselection in a subsequent procedure.

With reference to the eighth aspect, in a first implementation of the eighth aspect, the second access device is configured to broadcast second system information to the user equipment, where the second system information does not include the cell reselection information but includes cell access information corresponding to the first access device, and the first access device is a neighboring-cell access device of the second access device.

By performing the foregoing operation, the second access device may replace the first access device to broadcast the cell access information corresponding to the first access device, and may help the user equipment complete the random access procedure to the first access device.

With reference to the eighth aspect or the first implementation of the eighth aspect, in a second implementation of the eighth aspect, the random access message includes indication information used to indicate whether to obtain the first system information; and that the first access device is configured to send first system information to the user equipment based on the random access message is specifically: the first access device is configured to send the first system information to the user equipment based on the indication information.

By performing the foregoing operation, the first access device determines, based on the indication information, to send the first system information to the user equipment.

With reference to the eighth aspect, the first implementation of the eighth aspect, or the second implementation of the eighth aspect, in a third implementation of the eighth aspect, the random access message includes a random access preamble message; and that the first access device is configured to send first system information to the user equipment is specifically: the first access device is configured to:

add the first system information to a random access response message, and send the random access response message to the user equipment.

By performing the foregoing operation, the first access device may add the cell reselection information related to the first access device to the random access response message and send the random access response message to the user equipment in the random access procedure, instead of periodically broadcasting the cell reselection information. This avoids causing unnecessary waste of system resources.

With reference to the eighth aspect, the first implementation of the eighth aspect, or the second implementation of the eighth aspect, in a fourth implementation of the eighth aspect, the random access message includes an RRC connection request message; and that the first access device is configured to send first system information to the user equipment is specifically: the first access device is configured to: add the first system information to an RRC connection setup complete message, and send the RRC connection setup complete message to the user equipment.

By performing the foregoing operation, the first access device may add the first system information to the RRC connection setup complete message and send the RRC connection setup complete message to the user equipment in the random access procedure, instead of periodically broadcasting the cell reselection information. This avoids causing unnecessary waste of system resources.

According to a ninth aspect, a computer readable storage medium is provided. The readable storage medium stores program code for implementing the system message transmission method according to any one of the first aspect or the implementations of the first aspect, and the program code includes an execution instruction for running the foregoing system information transmission method.

According to a tenth aspect, a computer readable storage medium is provided. The readable storage medium stores program code for implementing the system message transmission method according to any one of the second aspect or the implementations of the second aspect, and the program code includes an execution instruction for running the foregoing system information transmission method.

With reference to any of the foregoing aspects, in some implementations of the present invention, the cell reselection information related to the first access device includes cell reselection information corresponding to the first access device and/or cell reselection information corresponding to a neighboring-cell access device of the first access device.

With reference to any of the foregoing aspects, in some implementations of the present invention, the random access message includes the indication information used to indicate whether to obtain the first system information, and the indication information is used to instruct the first access device to send the first system information to the user equipment. The first access device determines, based on the indication information, to send the first system information to the user equipment.

With reference to any of the foregoing aspects, in some implementations of the present invention, the random access message includes identity information of a target cell related to the first access device, and the cell reselection information related to the first access device includes cell reselection information corresponding to the target cell; and/or the random access message includes identifier information of a preset type of cell reselection information, and the cell reselection information related to the first access device includes a preset type of cell reselection information related to the first access device. The first access device may send specified cell reselection information corresponding to a specified cell to the user equipment based on a requirement of the user equipment.

With reference to any of the foregoing aspects, in some implementations of the present invention, the random access message includes the random access preamble message, and the indication information is used to instruct, by using a specified random access preamble sequence, a specified time-frequency location of a random access preamble sequence, or a specified first indicator, to obtain the first system information. The first access device may determine, based on the specified random access preamble sequence, the specified time-frequency location of the random access preamble sequence, or the specified first indicator that is included in the random access preamble message, that the first access device needs to send the first system information to the user equipment.

With reference to any of the foregoing aspects, in some implementations of the present invention, the second system information further includes information used to instruct the user equipment to determine the specified random access preamble sequence, the specified time-frequency location of the random access preamble sequence, or the specified first indicator. The user equipment determines, based on the information included in the second system information, the specified random access preamble sequence, the specified time-frequency location of the random access preamble sequence, or the specified first indicator.

With reference to any of the foregoing aspects, in some implementations of the present invention, the random access message includes the RRC connection request message, and the indication information is used to instruct, by using a specified second indicator, to obtain the first system information. The first access device may determine, based on the specified second indicator included in the RRC connection request message, that the first access device needs to send the first system information to the user equipment.

With reference to any of the foregoing aspects, in some implementations of the present invention, the second system information further includes information used to indicate the specified second indicator. The user equipment determines the specified second indicator based on the information included in the second system information.

BRIEF DESCRIPTION OF THE DRAWINGS

To describe technical solutions in embodiments of the present invention more clearly, the following briefly describes the accompanying drawings required for describing the embodiments.

DETAILED DESCRIPTION OF ILLUSTRATIVE EMBODIMENTS

Terms used in the embodiments of the present invention are only used to explain specific embodiments of the present invention, but not intended for limiting the present invention. The following clearly describes the technical solutions in the embodiments of the present invention with reference to the accompanying drawings in the embodiments of the present invention.

Figure 1:
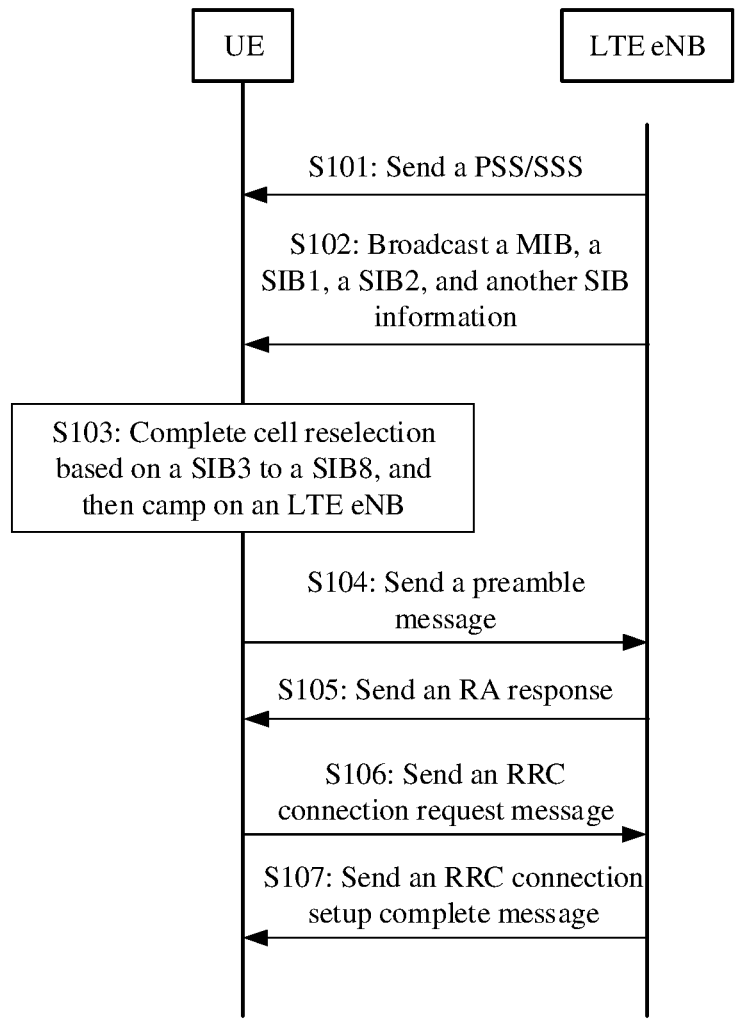
FIG. 1 is a schematic diagram of a system message transmission process in an existing LTE network.
Figure 2A:
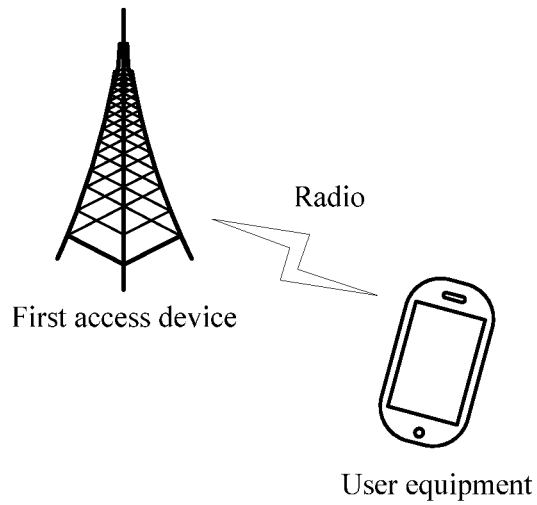
FIG. 2A is a schematic architectural diagram of a communications system in an embodiment of the present invention.

FIG. 2A is a schematic architectural diagram of a communications system in an embodiment of the present invention. The communications system includes user equipment and a first access device that is described in the following embodiments. The first access device and the user equipment communicate with each other by using a specific air interface technology. The air interface technology may include existing 2G (such as a Global System for Mobile Communications (GSM)), 3G (such as a Universal Mobile Telecommunications System (UMTS), Wideband Code Division Multiple Access (WCDMA), and Time Division-Synchronous Code Division Multiple Access (TD-SCDMA), 4G (such as FDD LTE and TDD LTE), a new radio access technology (New RAT) system such as a 4.5G or 5G system to be launched in the future, and the like.

The first access device may be a device configured to communicate with the user equipment. The first access device may be a BTS (Base Transceiver Station) in the GSM or CDMA, an NB (NodeB) in the WCDMA, an evolved NodeB (eNB) in LTE, a relay node, an in-vehicle device, a wearable device, an access network device in a future 5G network or in a future evolved public land mobile network (PLMN), or the like.

The user equipment may include a relay. A device that may perform data communication with a base station may be considered as the user equipment. In the present invention, the user equipment is user equipment (UE) in a general sense. In addition, the user equipment may also be referred to as a mobile console, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless phone, a Session Initiation Protocol (SIP) phone, a wireless local loop (WLL) station, a personal digital assistant (PDA), a handheld device with a wireless communication function, a computing device, another processing device connected to a wireless modem, an in-vehicle device, a wearable device, a mobile station in a future 5G network, a terminal device in a future evolved PLMN, or the like.

A cell mentioned in the following embodiments may be a cell corresponding to a base station. The cell may be served by a macro base station or a base station corresponding to a small cell (English: Small cell). The small cell herein may include a metro cell, a micro cell, a pico cell, a femto cell, or the like. These small cells feature a small coverage area and low transmit power, and are suitable for providing a high-rate data transmission service.

Figure 2B:
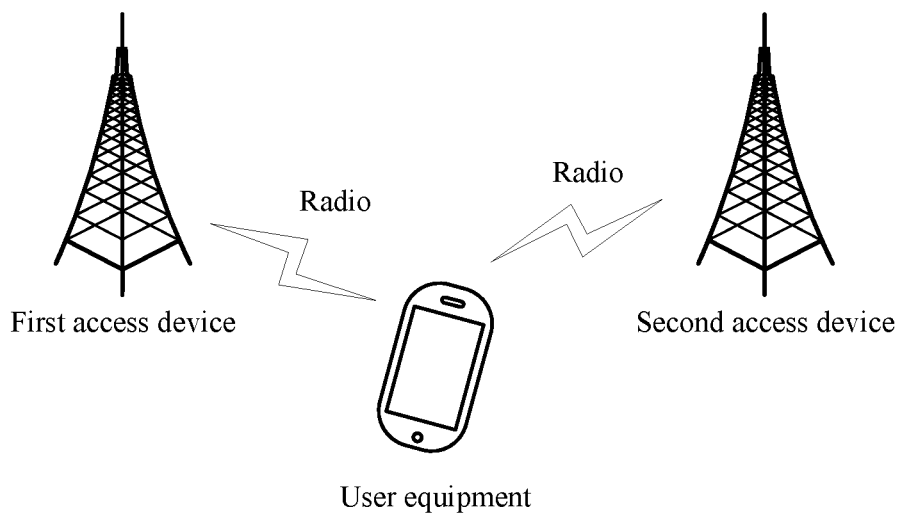
FIG. 2B is a schematic architectural diagram of another communications system in an embodiment of the present invention.

FIG. 2B is a schematic architectural diagram of another communications system in an embodiment of the present invention. The communications system includes user equipment, and a first access device and a second access device that are described in the following embodiments. The first access device and the second access device in the embodiments of the present invention may be inter-system base stations. In other words, a mobile communications network standard used by the first access device is different from a mobile communications network standard used by the second access device. Alternatively, the first access device and the second access device may be intra-system base stations. In other words, a mobile communications network standard used by the first access device is the same as a mobile communications network standard used by the second access device.

For example, for an LTE system, a non-LTE system may be considered as inter-system, such as an existing 2G (such as GSM) technology system or 3G (such as UMTS and WCDMA) technology system, and a 4.5G or 5G system to be launched in the future. Another LTE system may be considered as intra-system. LTE systems belonging to a same operator or LTE systems belonging to different operators may be considered as intra-system. Therefore, if the second access device is configured as an eNB in the LTE system, the first access device may be a BS (Base Station) in a GSM communications system, a NodeB in a UMTS communications system, a base station in a 4.5G or 5G system to be launched in the future, or the like. Preferably, the following embodiments are described by using an example in which the second access device is an eNB in an LTE system and the first access device is a base station in a future 5G network.

The user equipment may include a relay. A device that may perform data communication with a base station may be considered as the user equipment. In the present invention, the user equipment is UE in a general sense. In addition, the user equipment may also be referred to as a mobile console, an access terminal, a subscriber unit, a subscriber station, a mobile station, a remote station, a remote terminal, a mobile device, a user terminal, a terminal, a wireless communications device, a user agent, a user apparatus, or the like. The user equipment may be a cellular phone, a cordless phone, a SIP phone, a WLL station, a PDA, a handheld device with a wireless communication function, a computing device, another processing device connected to a wireless modem, an in-vehicle device, a wearable device, a mobile station in a future 5G network, a terminal device in a future evolved PLMN, or the like.

In the embodiments of the present invention, it should be noted that an access device may usually include a plurality of (such as three) cells. In related descriptions of the embodiments of the present invention, accessing an access device and accessing a cell by the user equipment may be considered to be equivalent.

Figure 3:
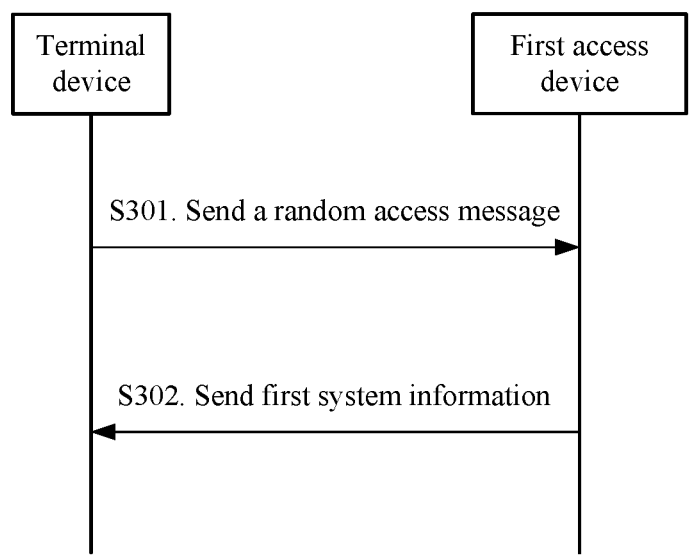
FIG. 3 is a schematic flowchart of a system message transmission method according to an embodiment of the present invention.

FIG. 3 is a schematic flowchart of a system message transmission method according to an embodiment of the present invention. The method includes but is not limited to the following steps.

S301. User equipment sends a random access message to a first access device.

In this embodiment of the present invention, user equipment in an idle state obtains cell reselection information related to a cell reselection procedure by initiating a random access procedure to the first access device, so as to perform cell reselection in a subsequent procedure, instead of obtaining cell reselection information in a periodic broadcasting procedure in the prior art. This can avoid causing unnecessary waste of system resources and save an air interface transmission resource.

The random access message includes a random access preamble message (a first message in the random access procedure, namely, a Msg1) or an RRC connection request message (a third message in the random access procedure, namely, a Msg3).

Optionally, before receiving the random access message sent by the user equipment, the first access device broadcasts second system information to the user equipment. The second system information does not include the cell reselection information but includes cell access information corresponding to the first access device.

In this embodiment of the present invention, when broadcasting the system information, the first access device broadcasts only the cell access information corresponding to the first access device, but does not broadcast cell reselection information related to the first access device. This not only can ensure that before performing the cell reselection procedure, the user equipment can obtain the cell reselection information by initiating the random access procedure to the first access device, but also can avoid causing unnecessary waste of system resources and save an air interface transmission resource. That the second system information does not include the cell reselection information may be understood as: The second system information does not include cell reselection information corresponding to the first access device, or the second system information includes neither cell reselection information corresponding to the first access device nor cell reselection information corresponding to another access device.

Optionally, before the first access device receives the random access message sent by the user equipment, a second access device broadcasts second system information corresponding to the first access device to the user equipment. The first access device is a neighboring-cell access device of the second access device, and the second system information does not include the cell reselection information but includes the cell access information corresponding to the first access device.

In this embodiment of the present invention, when replacing the first access device to broadcast the cell access information corresponding to the first access device, the second access device broadcasts only the cell access information corresponding to the first access device, and does not broadcast the cell reselection information related to the first access device. This not only can ensure that the user equipment can initiate the random access procedure to the first access device, but also can avoid causing unnecessary waste of system resources and save an air interface transmission resource.

S302. The first access device sends first system information to the user equipment based on the random access message.

In this embodiment of the present invention, the first system information includes the cell reselection information related to the first access device. In this embodiment of the present invention, the cell reselection information related to the first access device may be understood as the cell reselection information of the first access device, where the cell reselection information may be one or more pieces of intra-frequency cell reselection information, inter-frequency cell reselection information, and inter-system cell reselection information; the cell reselection information related to the first access device may be understood as cell reselection information corresponding to a neighboring-cell access device of the first access device, where the cell reselection information may be one or more pieces of intra-frequency cell reselection information, inter-frequency cell reselection information, and inter-system cell reselection information; or the cell reselection information related to the first access device may be understood as cell reselection information of the first access device and cell reselection information corresponding to a neighboring-cell access device of the first access device. This is not specifically limited in this embodiment of the present invention.

A service area of first access device may be divided into a plurality of cells, and the cell reselection information of the first access device may include cell reselection information corresponding to one or more of the plurality of cells. Similarly, the neighboring-cell access device of the first access device may also be divided into a plurality of cells, and the cell reselection information corresponding to the neighboring-cell access device of the first access device may include cell reselection information corresponding to one or more of the plurality of cells. Each access device maintains a neighboring cell list, and the first access device determines the neighboring-cell access device based on a neighboring cell list of the first access device by using an algorithm of the first access device. For example, the neighboring-cell access device is a layer 2 neighboring-cell access device of the first access device.

It should be noted that each access device may obtain related system information of a neighboring-cell access device, such as the cell access information and the cell reselection information described above. Therefore, the first access device can send the cell reselection information corresponding to the neighboring-cell access device of the first access device to the user equipment.

Optionally, after obtaining the first system information by using the random access procedure, the user equipment in the idle state may release a communications link between the user equipment and the first access device, to avoid occupying too many signaling resources.

Optionally, it may be specified in a communications protocol that once the first access device receives the random access message sent by the user equipment, it indicates that the first access device needs to send the first system information to the user equipment. Therefore, when receiving the random access message sent by the user equipment, the first access device may determine, according to the communications protocol, that the first access device needs to send the first system information to the user equipment. For example, the random access message is the RRC connection request message. Once the first access device receives the RRC connection request message sent by the user equipment, the first access device may determine that the first access device needs to send the first system information to the user equipment.

Optionally, a communications protocol may not be used to determine that the first access device needs to send the first system information to the user equipment; instead, indication information used to indicate whether to obtain the first system information may be added to the random access message sent by the user equipment, to instruct the first access device to send the first system information to the user equipment. After receiving the random access message, the first access device may learn of the indication information by parsing the random access message, and then determine, based on the indication information, whether the first access device needs to send the first system information to the user equipment. For example, a specified field carried in the random access message is used to indicate whether the user equipment needs to obtain the first system information. If the field is set to 1, it indicates that the user equipment needs to obtain the first system information, and the first access device sends the first system information to the user equipment. If the field is set to 0, it indicates that the user equipment does not need to obtain the first system information, and the first access device does not send the first system information to the user equipment.

Optionally, the random access message includes identity information of a target cell related to the first access device, and the cell reselection information related to the first access device includes cell reselection information corresponding to the target cell. The target cell related to the first access device may be a cell of the first access device or a cell of the neighboring-cell access device of the first access device, or may include both a cell of the first access device and a cell of the neighboring-cell access device of the first access device. This is not specifically limited in this embodiment of the present invention. The target cell may be determined by the user equipment. The user equipment adds an identity of the target cell to the random access message, and sends the random access message to the first access device. After receiving the random access message, the first access device may determine the target cell by parsing the random access message, and then send the cell reselection information corresponding to the target cell to the user equipment.

Further/Alternatively, the random access message includes identifier information of a preset type of cell reselection information, and the cell reselection information related to the first access device includes a preset type of cell reselection information related to the first access device. Which type of cell reselection information specifically included in the first system information may also be determined by the user equipment. The user equipment adds an identifier of the preset type of cell reselection information to the random access message, and sends the random access message to the first access device. After receiving the random access message, the first access device may determine, by parsing the random access message, which type of cell reselection information that the user equipment needs to obtain, and then send, to the user equipment, the cell reselection information that the user equipment needs to obtain. Alternatively, the random access message carries both the identity information of the target cell and the identifier information of the preset type of cell reselection information. In this way, the first access device sends a designated type of cell reselection information corresponding to a designated cell to the user equipment based on a requirement of the user equipment. For example, in an LTE network, the first access device is an eNB1, and the eNB1 serves three cells: a cell 1, a cell 2, and a cell 3. The eNB1 includes three neighboring cells: an eNB2, an eNB3, and an eNB4. Cells corresponding to the eNB2 include a cell 4, a cell 5, and a cell 6, cells corresponding to the eNB3 include a cell 7, a cell 8, and a cell 9, and cells corresponding to the eNB4 include a cell 10, a cell 11, and a cell 12. A random access message sent by UE to the eNB1 carries identity information of the cell 4 of the eNB2, and the random access message carries identifier information of an SIB3. In this case, after receiving the random access message sent by the UE, the eNB1 sends the SIB3 corresponding to the cell 4 to the UE.

Optionally, the random access message includes the random access preamble message, and the indication information is used to instruct, by using a specified random access preamble sequence, a specified time-frequency location of a random access preamble sequence, or a specified first indicator, to obtain the first system information. The first access device may determine, based on the specified random access preamble sequence, the specified time-frequency location of the random access preamble sequence, or the specified first indicator that is included in the random access preamble message, that the first access device needs to send the first system information to the user equipment.

The user equipment may use the specified random access preamble sequence to indicate that user equipment needs to obtain the first system information. Usually, there are a maximum of 64 available random access preamble sequences for a cell. One or more designated random access preamble sequences of the 64 available random access preamble sequences may be used to indicate that the user equipment needs to obtain the first system information, and other remaining random access preamble sequences are used to indicate that the user equipment does not need to the first system information. The user equipment selects and sends the specified random access preamble sequence to the first access device, to notify the first access device that the first access device needs to send the first system information. After receiving the random access preamble message including the specified random access preamble sequence, the first access device may determine, by identifying the random access preamble sequence, that the first access device needs to send the first system information to the user equipment. For example, a first random access preamble sequence and a sixtieth random access preamble sequence of the 64 random access preamble sequences may be used to indicate that the user equipment needs to obtain the first system information. Optionally, the specified random access preamble sequence may be used to indicate the identity of the target cell. Optionally, the specified random access preamble sequence may be used to indicate the identifier of the preset type of cell reselection information. For example, a random access preamble sequence 1 may be used to indicate that a SIB3 needs to be obtained, and a random access preamble sequence 2 may be used to indicate that a SIB4 needs to be obtained.

For another example, the 64 random access preamble sequences are classified into two groups: The first 32 random access preamble sequences of the 64 random access preamble sequences are classified into a group A, and the last 32 random access preamble sequences of the 64 random access preamble sequences are classified into a group B. The 32 random access preamble sequences in the group A are used to indicate that the user equipment needs to obtain the first system information, and the 32 random access preamble sequences in the group B are used to indicate that the user equipment does not need to obtain the first system information. Alternatively, the 32 random access preamble sequences in the group A are used to indicate that the user equipment does not need to obtain the first system information, and the 32 random access preamble sequences in the group B are used to indicate that the user equipment needs to obtain the first system information. Optionally, the specified random access preamble sequence may be used to indicate the identity of the target cell. Optionally, the specified random access preamble sequence may be used to indicate the identifier of the preset type of cell reselection information. For example, a random access preamble sequence in the group A may be used to indicate that the SIB3 needs to be obtained, and a random access preamble sequence in the group B may be used to indicate that the SIB4 needs to be obtained.

The user equipment may alternatively use the specified time-frequency location of the random access preamble sequence to indicate that the user equipment needs to obtain the first system information. By transmitting the specified time-frequency location of the random access preamble sequence to the first access device, the user equipment instructs the first access device to send the first system information to the user equipment. A time-frequency location different from the specified time-frequency location may be used to indicate that the user equipment does not need to obtain the first system information. Optionally, the specified time-frequency location may be used to indicate the identity of the target cell. Optionally, the specified time-frequency location may be used to indicate the identifier of the preset type of cell reselection information.

The user equipment may alternatively use the specified first indicator in the random access message to indicate that the user equipment needs to obtain the first system information. The specified first indicator may be indicated by using a bit in a random access preamble sequence. For example, a random access preamble sequence includes nine bits, and a fifth bit of the nine bits is used to indicate whether the user equipment needs to obtain the first system information. If the bit is 1, it indicates that the user equipment needs to obtain the first system information; if the bit is 0, it indicates that the user equipment does not need to obtain the first system information. The specified first indicator may alternatively be added to the end of the random access preamble sequence. A bit is added to the end of an original LTE random preamble sequence as an indication bit, and the indication bit is used to indicate whether to obtain the first system information. Correspondingly, a bit may alternatively be added to the front of the original LTE random preamble sequence as an indication bit, and the indication bit is used to indicate whether to obtain the first system information. Optionally, the specified first indicator may be used to indicate the identity of the target cell. Optionally, the specified first indicator may be used to indicate the identifier of the preset type of cell reselection information.

An indication of the specified random access preamble sequence, the specified time-frequency location of the random access preamble sequence, or the specified first indicator may be set by using a communications protocol, may be sent by the first access device to the user equipment when the first access device broadcasts the second system information, may be sent by the neighboring-cell access device of the first access device to the user equipment when the neighboring-cell access device of the first access device broadcasts the second system information, or may be sent by the first access device to the user equipment in the random access procedure. For example, the first access device may be an eNB. The eNB adds, to a SIB2, information used to indicate the specified random access preamble sequence, the specified time-frequency location of the random access preamble sequence, or the specified first indicator. UE may learn of the specified random access preamble sequence, the specified time-frequency location of the random access preamble sequence, or the specified first indicator by parsing the SIB2. For another example, the UE sends a random access preamble message to the eNB. The eNB adds, to a random access response message, information used to indicate the specified random access preamble sequence, the specified time-frequency location of the random access preamble sequence, or the specified first indicator, and sends the random access response message to the UE. After receiving the random access response message, the UE parses out the specified random access preamble sequence, the specified time-frequency location of the random access preamble sequence, or the specified first indicator, and then may add the specified random access preamble sequence, the specified time-frequency location of the random access preamble sequence, or the specified first indicator to the RRC connection request message, to instruct the eNB to send the first system information.

Optionally, the random access message includes the RRC connection request message, and the indication information is used to instruct, by using a specified second indicator, to obtain the first system information. The first access device may determine, based on the specified second indicator included in the RRC connection request message, that the first access device needs to send the first system information to the user equipment. The specified second indicator may be added to the end of the RRC connection request message. A bit is added to the end of an original LTE RRC connection request message as an indication bit, and the indication bit is used to indicate whether the user equipment needs to obtain the first system information. Correspondingly, a bit may alternatively be added to the front of the original LTE RRC connection request message as an indication bit, and the indication bit is used to indicate whether the user equipment needs to obtain the first system information. Optionally, the specified second indicator may be used to indicate the identity of the target cell. Optionally, the specified second indicator may be used to indicate the identifier of the preset type of cell reselection information.

Optionally, an indication of the specified second indicator may be set by using a communications protocol, may be sent by the first access device to the user equipment when the first access device broadcasts the second system information, may be sent by the neighboring-cell access device of the first access device to the user equipment when the neighboring-cell access device of the first access device broadcasts the second system information, or may be sent by the first access device to the user equipment in the random access procedure. For example, the first access device is an eNB. The eNB adds, to a SIB2, information used to indicate the specified second indicator, and the UE may learn of the specified second indicator by parsing the SIB2.

Optionally, if the random access message sent by the user equipment to the first access device is the random access preamble message, the first access device adds the first system information to a random access response message, and sends the random access response message to the user equipment.

Optionally, if the random access message sent by the user equipment to the first access device is the RRC connection request message, the first access device adds the first system information to an RRC connection setup complete message, and sends the RRC connection setup complete message to the user equipment.

Optionally, if the random access message sent by the user equipment to the first access device is the random access preamble message, the first access device may add the first system information to an RRC connection setup complete message, and send the RRC connection setup complete message to the user equipment.

By performing the foregoing steps, the first access device sends the cell reselection information related to the first access device to the user equipment in the random access procedure, so that the user equipment can perform cell reselection in a subsequent procedure. Compared with the prior art, this method can send the cell reselection information without using a periodic broadcasting manner, so as to avoid causing unnecessary waste of system resources and save an air interface transmission resource.

To better implement the system message transmission method in the embodiment of the present invention, the present invention further provides a related device configured to implement the method.

Figure 4:
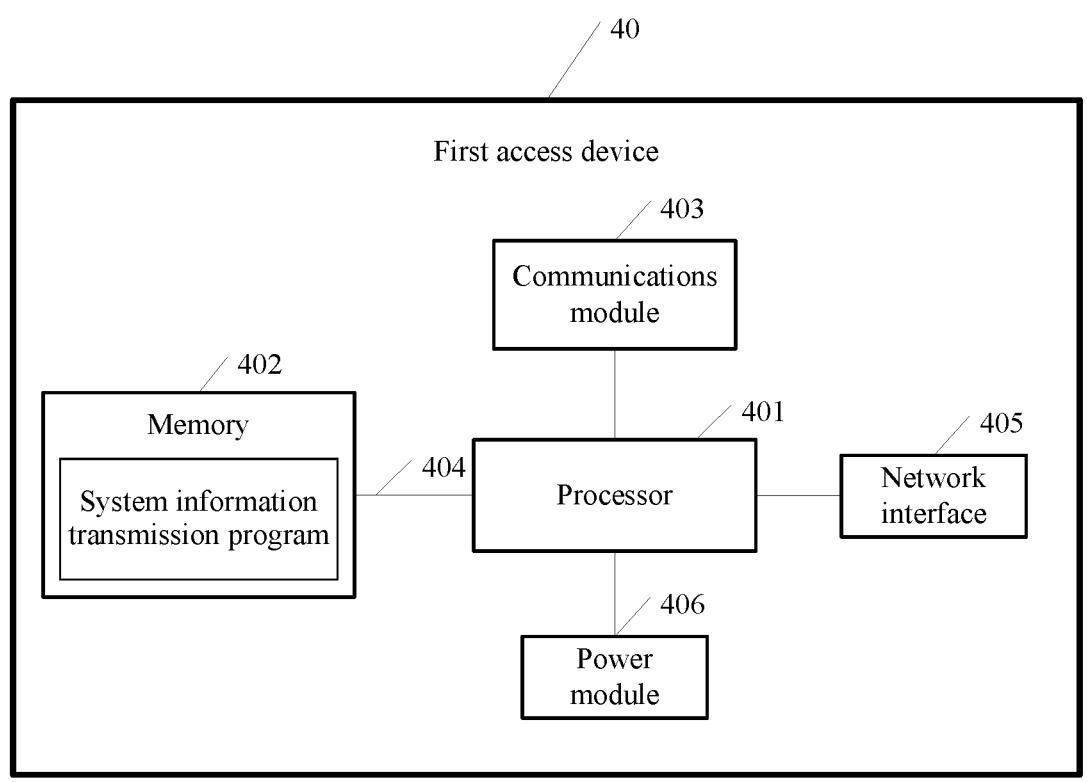
FIG. 4 is a schematic structural diagram of an access device according to an embodiment of the present invention.

FIG. 4 is a schematic structural diagram of an access device according to an embodiment of the present invention. As shown in FIG. 4, the access device is a first access device 40, the first access device 40 includes a processor 401, a memory 402, a communications module 403, and a bus 404, and the processor 401, the memory 402, and the communications module 403 may be connected by using the bus or in another manner. In FIG. 4, for example, connection is implemented by using the bus 404.

Optionally, the first access device 40 may further include a network interface 405 and a power module 406.

The processor 401 may be a digital signal processing (DSP) chip. The processor 401 is configured to: perform wireless channel management, and control a cell handover of a terminal device in a control zone. During specific implementation, the processor 401 may include modules such as an AM/CM module (used as a center of speech channel switching and information exchange), a BM module (configured to implement call processing, signaling processing, radio resource management, radio link management, and circuit maintenance functions), and a TCSM module (configured to implement multiplexing, demultiplexing, and transcoding functions). For specific information, refer to knowledge related to mobile communications.

The memory 402 is configured to store program code for system message transmission. During specific implementation, the memory 402 may be a read-only memory (ROM) or a random access memory (RAM), and may be configured to store the program code for system message transmission.

The communications module 403 is configured to perform transmitting processing (such as modulation) on a mobile communications signal generated by the processor 401, and is further configured to perform receiving processing (such as demodulation) on a mobile communications signal received by an antenna.

The bus 404 may be an industry standard architecture (ISA) bus, a peripheral component interconnect (PCI) bus, an extended industry standard architecture (EISA) bus, an inter-integrated circuit (IIC) bus, or the like.

The network interface 405 is used for data communication between the first access device 40 and a terminal (a mobile station MS in 2G or UE in 3G or 4G). During specific implementation, the network interface 405 may include one or more of a GSM (2G) wireless network interface, a WCDMA (3G) wireless network interface, an LTE (4G) wireless network interface, and the like, or may be a future 4.5G or 5G wireless network interface.

The power module 406 is configured to supply power to each module of the first access device 40.

In this embodiment of the present invention, the processor 401 is further configured to invoke the program code for system message transmission in the memory 402, to perform the following operations: receiving, by the processor 401 by using the communications module 403, a random access message sent by user equipment; and sending, by the processor 401, first system information to the user equipment based on the random access message by using the communications module 403, where the first system information includes cell reselection information related to the first access device.

By performing the foregoing operations, the first access device sends the cell reselection information related to the first access device to the user equipment in a random access procedure, so that the user equipment can perform cell reselection in a subsequent procedure.

It should be noted that the first access device 40 may be applicable to a 2G communications system (such as GSM), a 3G communications system (such as UMTS), a 4G communications system (LTE), and a future 4.5G or 5G communications system.

Optionally, before the processor 401 receives, by using the communications module 403, the random access message sent by the user equipment, the processor is further configured to: broadcast, by the processor 401, second system information to the user equipment by using the communications module 403, where the second system information does not include the cell reselection information but includes cell access information corresponding to the first access device.

By performing the foregoing operation, when broadcasting the system information, the first access device broadcasts only the cell access information corresponding to the first access device, and does not broadcast the cell reselection information related to the first access device. This not only can ensure that before performing a cell reselection procedure, the user equipment can obtain the cell reselection information by initiating a random access procedure to the first access device, but also can avoid causing unnecessary waste of system resources and save an air interface transmission resource.

Optionally, the random access message includes indication information used to indicate whether to obtain the first system information; and the sending, by the processor 401, first system information to the user equipment based on the random access message by using the communications module 403 includes: sending, by the processor 401, the first system information to the user equipment based on the indication information by using the communications module 403.

By performing the foregoing operation, the first access device determines, based on the indication information, to send the first system information to the user equipment.

Optionally, the random access message includes identity information of a target cell related to the first access device, and the cell reselection information related to the first access device includes cell reselection information corresponding to the target cell; and/or the random access message includes identifier information of a preset type of cell reselection information, and the cell reselection information related to the first access device includes a preset type of cell reselection information related to the first access device.

Optionally, the random access message includes a random access preamble message, and the indication information is used to instruct, by using a specified random access preamble sequence, a specified time-frequency location of a random access preamble sequence, or a specified first indicator, to obtain the first system information.

Optionally, the second system information further includes information used to instruct the user equipment to determine the specified random access preamble sequence, the specified time-frequency location of the random access preamble sequence, or the specified first indicator.

Optionally, the random access message includes a random access preamble message; and the sending, by the processor 401, first system information to the user equipment by using the communications module 403 includes: carrying, by the processor 401, the first system information to a random access response message, and sending the random access response message to the user equipment by using the communications module 403.

By performing the foregoing operation, the first access device may add the cell reselection information related to the first access device to the random access response message and send the random access response message to the user equipment in the random access procedure, instead of periodically broadcasting the cell reselection information. This avoids causing unnecessary waste of system resources.

Optionally, the random access message includes an RRC connection request message, and the indication information is used to instruct, by using a specified second indicator, to obtain the first system information.

Optionally, the second system information further includes information used to indicate the specified second indicator.

Optionally, the random access message includes an RRC connection request message; and the sending, by the processor 401, first system information to the user equipment by using the communications module 403 includes: carrying, by the processor 401, the first system information to an RRC connection setup complete message, and sending the RRC connection setup complete message to the user equipment by using the communications module 403.

By performing the foregoing operation, the first access device may add the first system information to the RRC connection setup complete message and send the RRC connection setup complete message to the user equipment in the random access procedure, instead of periodically broadcasting the cell reselection information. This avoids causing unnecessary waste of system resources.

It should be noted that for a function of each function module of the first access device 40 described in this embodiment of the present invention, reference may be made to the related description of the corresponding first access device in the embodiment shown in FIG. 3. Details are not described herein again.

Figure 5:
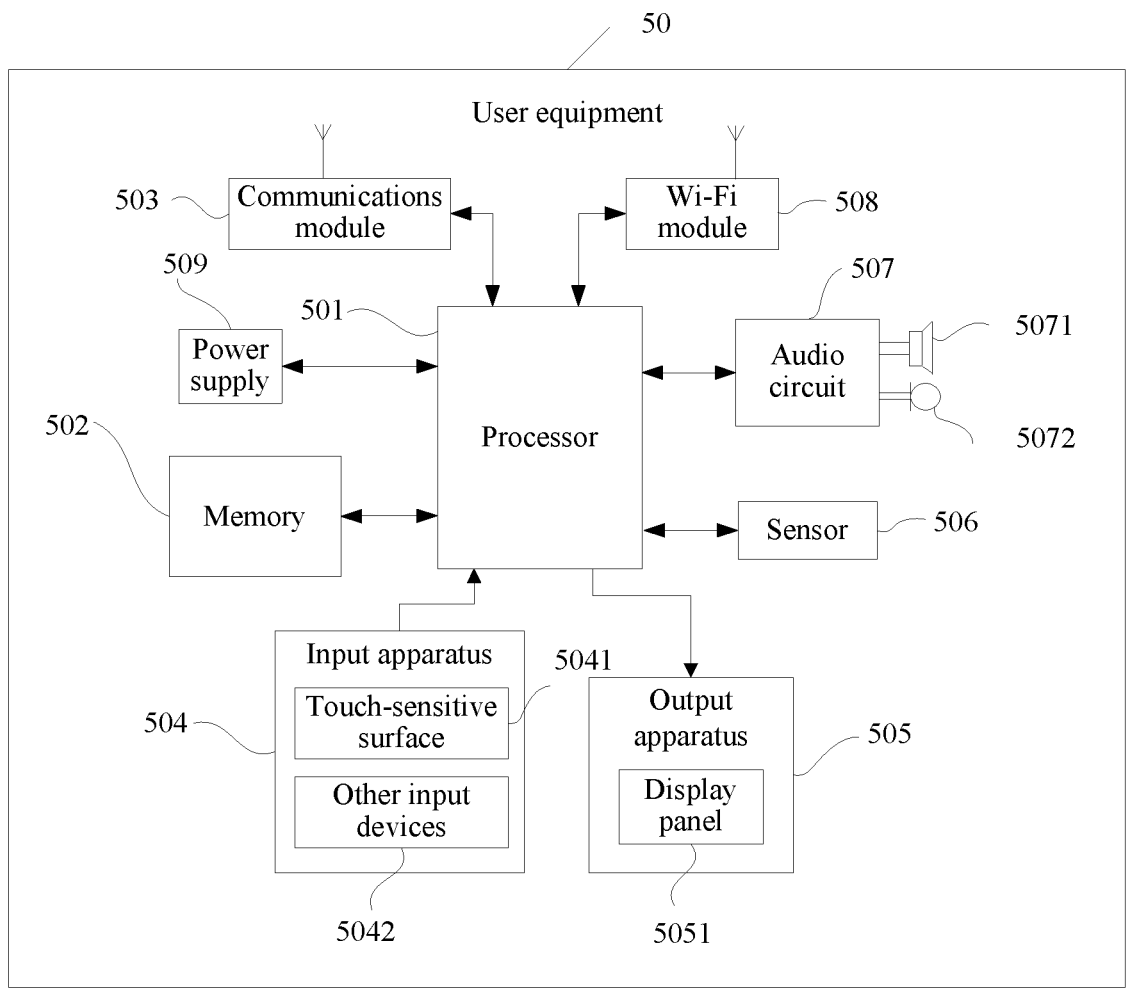
FIG. 5 is a schematic structural diagram of user equipment according to an embodiment of the present invention.

FIG. 5 is a schematic structural diagram of an electronic device (user equipment 50) according to an embodiment of the present invention. The user equipment 50 shown in FIG. 5 includes components such as a processor 501 including one or more processing cores, a memory 502 storing one or more computer programs, a communications module 503, an input apparatus 504, an output apparatus 505, a sensor 506, an audio circuit 507, a Wireless Fidelity (WiFi) module 508, and a power supply 509. A person skilled in the art may understand that a structure of the electronic device shown in FIG. 5 constitutes no limitation to the electronic device, and the electronic device may include components more or fewer than those shown in the figure, or a combination of some components, or components disposed differently.

The communications module 503 may be configured to receive and send information, or receive and send signals in a call process. In particular, the communications module 503 receives downlink information of a base station and then sends the downlink information to one or more processors 501 for processing, and also sends related uplink data to the base station. Usually, the communications module 503 includes but is not limited to an antenna, at least one amplifier, a tuner, one or more oscillators, a subscriber identity module (SIM) card, a transceiver, a coupler, a low noise amplifier (LNA), and a duplexer. In addition, the communications module 503 may further communicate with a network and another terminal device through wireless communication. The wireless communication may be implemented by using any communications standard or protocol, including but not limited to GSM, general packet radio service (GPRS), CDMA, WCDMA, LTE, email, and a short message service (SMS).

The memory 502 may be configured to store a program and a module for system message transmission. The processor 501 executes various function applications and processes data by running the computer program and the module stored in the memory 502. The memory 502 may mainly include a program storage area and a data storage area. The program storage area may store an operating system, an application program required by at least one function (such as a voice playback function or an image playback function), and the like. The data storage area may store data (such as a photograph, audio data, and video data) and the like created based on usage of the user equipment 50. In addition, the memory 502 may include a high-speed random access memory, and may also include a non-volatile memory such as at least one disk storage device, a flash memory device, or another non-volatile solid-state storage device. Correspondingly, the memory 502 may further include a memory controller to allow the processor 501 and the input apparatus 504 to access the memory 502.

The input apparatus 504 may be configured to receive input digital or character information, and generate keyboard, mouse, joystick, optical, or trackball signal input related to user setting and function control. Specifically, the input apparatus 504 may include a touch-sensitive surface 5041 and other input devices 5042. The touch-sensitive surface 5041 is also referred to as a touch display panel or a touch panel, and may collect a touch operation performed by a user on or near the touch-sensitive surface 5041 (such as an operation performed by the user on the touch-sensitive surface 5041 or near the touch-sensitive surface 5041 by using any suitable object or accessory, such as a finger or a stylus), and drive a corresponding connection apparatus according to a preset program. Optionally, the touch-sensitive surface 5041 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 501, and can receive and execute a command transmitted by the processor 501. In addition, the touch-sensitive surface 5041 may be implemented by using a plurality of types, such as a resistive type, a capacitive type, an infrared type, and a surface acoustic wave type. In addition to the touch-sensitive surface 5041, the input apparatus 504 may further include the other input devices 5042. Specifically, the other input devices 5042 may include but is not limited to one or more of a physical keyboard, a function key (such as a volume control key or an on/off key), a trackball, a mouse, a joystick, and the like.

The output apparatus 505 may be configured to display information entered by the user or information provided to the user, and various graphical user interfaces of the user equipment 50. These graphical user interfaces may include a graph, a text, an icon, a video, or any combination thereof. The output apparatus 505 may include a display panel 5051. Optionally, the display panel 5051 may be configured in a form of a liquid crystal display (LCD), an organic light-emitting diode (OLED), or the like. Further, the touch-sensitive surface 5041 may cover the display panel 5051. When a touch operation on or near the touch-sensitive surface 5041 is detected, the touch-sensitive surface 5041 transfers information about the touch operation to the processor 501 to determine a type of a touch event, and then the processor 501 provides corresponding visual output on the display panel 5051 based on the type of the touch event. In FIG. 5, the touch-sensitive surface 5041 and the display panel 5051 are configured as two independent parts to implement input and output functions. However, in some embodiments, the touch-sensitive surface 5041 and the display panel 5051 may be integrated to implement the input and output functions.

The user equipment 50 may further include at least one sensor 506 such as a light sensor, a motion sensor, and another sensor. Specifically, the light sensor may include an ambient light sensor and a proximity sensor. The ambient light sensor may adjust luminance of the display panel 5051 according to brightness of ambient light. The proximity sensor may turn off the display panel 5051 and/or backlight when the user equipment 50 moves close to an ear. As a type of motion sensor, an accelerometer sensor may detect magnitudes of acceleration in various directions (usually three axes), may detect, in a static state, a magnitude and a direction of gravity, and may be used for an application recognizing a posture of the user equipment 50 (such as screen switching between a portrait mode and a landscape mode, a related game, and magnetometer posture calibration), a vibration identification-related function (such as a pedometer or tapping), and the like. For other sensors that may also be configured for the user equipment 50, such as a gyroscope, a barometer, a hygrometer, a thermometer, and an infrared sensor, details are not described herein.

The audio circuit 507, a loudspeaker 5071, and a microphone 5072 may provide an audio interface between the user and the user equipment 50. The audio circuit 507 may transmit, to the loudspeaker 5071, an electrical signal that is converted from received audio data, and the loudspeaker 5071 converts the electrical signal into a sound signal and outputs the sound signal. In addition, the microphone 5072 converts a collected sound signal into an electrical signal; and the audio circuit 507 receives and converts the electrical signal into audio data, and outputs the audio data to the processor 501 for processing, so that processed audio data is sent to, for example, another user equipment by using the communications module 503, or outputs the audio data to the memory 502 for further processing. The audio circuit 507 may further include an earphone jack, to facilitate communication between a peripheral earphone and the user equipment 50.

Wi-Fi is a short-distance wireless transmission technology. With the Wi-Fi module 508, the user equipment 50 may help the user receive and send emails, browse a web page, access streaming media, and the like. The Wi-Fi module 508 provides wireless access to the broadband Internet for the user. Although FIG. 5 shows the Wi-Fi module 508, it can be understood that the Wi-Fi module 508 is not a necessary constituent of the user equipment 50 and may be completely omitted based on a requirement without changing the essence scope of the present invention.

The processor 501 is a control center of the user equipment 50, and is connected to all components of the entire user equipment 50 by using various interfaces and lines. By running or executing a computer program and/or a module stored in the memory 502 and invoking data stored in the memory 502, the processor 501 executes various functions of the user equipment 50 and processes data, so as to perform overall monitoring on the user equipment 50. Optionally, the processor 501 may include one or more processing cores. Preferably, an application processor and a modem processor may be integrated into the processor 501. The application processor mainly processes an operating system, a user interface, an application program, and the like; and the modem processor mainly processes radio communication. It can be understood that the modem processor may be not integrated into the processor 501.

The user equipment 50 further includes the power supply 509 (such as a battery) that supplies power to each component. Preferably, the power supply 509 may be logically connected to the processor 501 by using a power supply management system, so as to implement functions such as charging management, discharging management, and power consumption management by using the power supply management system. The power supply 509 may further include one or more direct current or alternating current power supplies, a re-charge system, a power failure detection circuit, a power converter or inverter, a power supply status indicator, and any other component.

Although not shown, the user equipment 50 may further include a camera, a Bluetooth module, or the like, and details are not described herein. Specifically, in this embodiment of the present invention, the output apparatus 505 (or the input apparatus 504) in the electronic device is a touchscreen display. The user equipment 50 further includes the memory 502, the processor 501, and the one or more computer programs. The one or more computer programs are stored in the memory 502. The processor 501 is configured to invoke a multimedia file management program stored in the memory 502 (a non-volatile memory), to perform the following steps.

In this embodiment of the present invention, the processor 501 is mainly configured to invoke the program stored in the memory 502, to perform the following operations: sending, by the processor 501, a random access message to a first access device by using the communications module 503; and receiving, by the processor 501 by using the communications module 503, first system information sent by the first access device, where the first system information includes cell reselection information related to the first access device.

By performing the foregoing operations, the user equipment initiates a random access procedure to the first access device, and receives, in the random access procedure, the cell reselection information related to the first access device that is sent by the first access device, so that the user equipment can perform cell reselection in a subsequent procedure.

Optionally, before the processor 501 sends the random access message to the first access device by using the communications module 503, the processor is further configured to: receive, by the processor 501 by using the communications module 503, second system information broadcast by the first access device or the second access device, where the second system information does not include the cell reselection information but includes cell access information corresponding to the first access device, and the first access device is a neighboring-cell access device of the second access device.

By performing the foregoing operation, the user equipment receives the cell access information corresponding to the first access device that is broadcast by the first access device or the second access device, and the system information broadcast by the first access device or the second access device does not include the cell reselection information related to the first access device. This not only can ensure that before performing a cell reselection procedure, the user equipment can obtain the cell reselection information by initiating the random access procedure to the first access device, but also can avoid causing unnecessary waste of system resources and save an air interface transmission resource.

Optionally, the random access message includes indication information used to indicate whether to obtain the first system information, and the indication information is used to instruct the first access device to send the first system information to the user equipment.

Optionally, the random access message includes identity information of a target cell related to the first access device, and the cell reselection information related to the first access device includes cell reselection information corresponding to the target cell; and/or the random access message includes identifier information of a preset type of cell reselection information, and the cell reselection information related to the first access device includes a preset type of cell reselection information related to the first access device.

Optionally, the random access message includes a random access preamble message, and the indication information is used to instruct, by using a specified random access preamble sequence, a specified time-frequency location of a random access preamble sequence, or a specified first indicator, to obtain the first system information.

Optionally, the second system information further includes information used to instruct the user equipment to determine the specified random access preamble sequence, the specified time-frequency location of the random access preamble sequence, or the specified first indicator.

Optionally, the random access message is a random access preamble message; and the receiving, by the processor 501 by using the communications module 503, first system information sent by the first access device includes: receiving, by the processor 501 by using the communications module 503, a random access response message that carries the first system information and that is sent by the first access device.

By performing the foregoing operation, the user equipment may receive the random access response message that carries the cell reselection information related to the first access device and that is sent by the first access device, and the first access device does not periodically broadcast the cell reselection information. This avoids causing unnecessary waste of system resources.

Optionally, the random access message includes a radio resource control RRC connection request message, and the indication information is used to instruct, by using a specified second indicator, to obtain the first system information.

Optionally, the second system information further includes information used to indicate the specified second indicator.

Optionally, the random access message includes an RRC connection request message; and the receiving, by the processor 501 by using the communications module 503, first system information sent by the first access device includes: receiving, by the processor 501 by using the communications module 503, an RRC connection setup complete message that carries the first system information and that is sent by the first access device.

By performing the foregoing operation, the user equipment may receive the RRC connection setup complete message that carries the cell reselection information related to the first access device and that is sent by the first access device, and the first access device does not periodically broadcast the cell reselection information. This avoids causing unnecessary waste of system resources.

It should be noted that for a function of each function module of the user equipment 50 described in this embodiment of the present invention, reference may be made to the related description of the corresponding user equipment in the embodiment shown in FIG. 3. Details are not described herein again.

Figure 6:
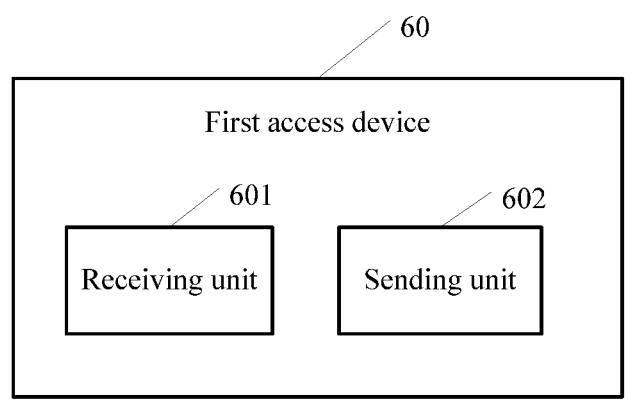
FIG. 6 is a schematic structural diagram of another access device according to an embodiment of the present invention.

FIG. 6 is a schematic structural diagram of another access device according to an embodiment of the present invention. As shown in FIG. 6, the access device is a first access device, and the first access device 60 includes a receiving unit 601 and a sending unit 602.

The receiving unit 601 is configured to receive a random access message sent by user equipment.

The sending unit 602 is configured to send first system information to the user equipment based on the random access message, where the first system information includes cell reselection information related to the first access device.

In this embodiment, the first access device 60 is presented in a form of a function unit. The "unit" herein may be an application-specific integrated circuit (ASIC), a processor executing one or more software or firmware programs, a memory, an integrated logical circuit, and/or another device that can provide the foregoing functions. The first access device 60 may be in a form shown in FIG. 4. The receiving unit 601 and the sending unit 602 may be implemented by the processor 401 in FIG. 4, or may be implemented by the communications module 403 in FIG. 4.

By running the units, the first access device sends the cell reselection information related to the first access device to the user equipment in a random access procedure, so that the user equipment can perform cell reselection in a subsequent procedure.

Optionally, the first access device 60 further includes: a broadcasting unit, configured to broadcast second system information to the user equipment, where the second system information does not include the cell reselection information but includes cell access information corresponding to the first access device.

By running the unit, when broadcasting the system information, the first access device broadcasts only the cell access information corresponding to the first access device, and does not broadcast the cell reselection information related to the first access device. This not only can ensure that the user equipment can initiate the random access procedure to the first access device, but also can avoid causing unnecessary waste of system resources and save an air interface transmission resource.

Optionally, the random access message includes indication information used to indicate whether to obtain the first system information; and the sending unit 602 is specifically configured to: send the first system information to the user equipment based on the indication information.

By running the foregoing unit, the first access device determines, based on the indication information, to send the first system information to the user equipment.

Optionally, the random access message includes a random access preamble message; and the sending unit 602 is specifically configured to: add the first system information to a random access response message, and send the random access response message to the user equipment.

By running the unit, the first access device may add the cell reselection information related to the first access device to the random access response message and send the random access response message to the user equipment in the random access procedure, instead of periodically broadcasting the cell reselection information. This avoids causing unnecessary waste of system resources.

Optionally, the random access message includes an RRC connection request message; and the sending unit 602 is specifically configured to: add the first system information to an RRC connection setup complete message, and send the RRC connection setup complete message to the user equipment.

By running the unit, the first access device may add the first system information to the RRC connection setup complete message and send the RRC connection setup complete message to the user equipment in the random access procedure, instead of periodically broadcasting the cell reselection information. This avoids causing unnecessary waste of system resources.

It should be noted that for a function of each function module of the first access device 60 described in this embodiment of the present invention, reference may be made to the related description of the corresponding first access device in the embodiment shown in FIG. 3. Details are not described herein again.

Figure 7:
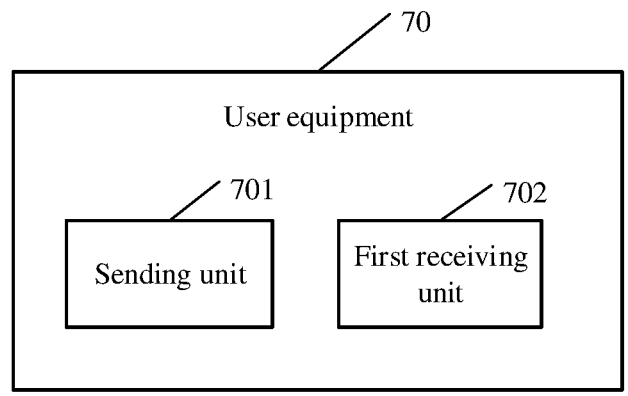
FIG. 7 is a schematic structural diagram of another user equipment according to an embodiment of the present invention.

FIG. 7 is a schematic structural diagram of another user equipment according to an embodiment of the present invention. As shown in FIG. 7, the user equipment 70 includes a sending unit 701 and a first receiving unit 702.

The sending unit 701 is configured to send a random access message to a first access device.

The first receiving unit 702 is configured to receive first system information sent by the first access device, where the first system information includes cell reselection information related to the first access device.

In this embodiment, the user equipment 70 is presented in a form of a function unit. The "unit" herein may be an ASIC, a processor executing one or more software or firmware programs, a memory, an integrated logical circuit, and/or another device that can provide the foregoing functions. The user equipment 70 may be in a form shown in FIG. 5. The sending unit 701 and the first receiving unit 702 may be implemented by the processor 501 in FIG. 5, or may be implemented by the communications module 503 in FIG. 5.

By running the units, the user equipment initiates a random access procedure to the first access device, and receives, in the random access procedure, the cell reselection information related to the first access device that is sent by the first access device, so that the user equipment can perform cell reselection in a subsequent procedure.

Optionally, the user equipment 70 further includes: a second receiving unit, configured to receive second system information broadcast by the first access device or the second access device, where the second system information does not include the cell reselection information but includes cell access information corresponding to the first access device, and the first access device is a neighboring-cell access device of the second access device.

By running the foregoing unit, the user equipment receives the cell access information corresponding to the first access device that is broadcast by the first access device or the second access device, and the system information broadcast by the first access device or the second access device does not include the cell reselection information related to the first access device. This not only can ensure that the user equipment can initiate the random access procedure to the first access device, but also can avoid causing unnecessary waste of system resources and save an air interface transmission resource.

Optionally, the random access message is a random access preamble message; and the first receiving unit 702 is specifically configured to: receive a random access response message that carries the first system information and that is sent by the first access device.

By running the foregoing unit, the user equipment may receive the random access response message that carries the cell reselection information related to the first access device and that is sent by the first access device, and the first access device does not periodically broadcast the cell reselection information. This avoids causing unnecessary waste of system resources.

Optionally, the random access message includes an RRC connection request message; and the first receiving unit 702 is specifically configured to: receive an RRC connection setup complete message that carries the first system information and that is sent by the first access device.

By running the foregoing unit, the user equipment may receive the RRC connection setup complete message that carries the cell reselection information related to the first access device and that is sent by the first access device, and the first access device does not periodically broadcast the cell reselection information. This avoids causing unnecessary waste of system resources.

It should be noted that for a function of each function module of the user equipment 70 described in this embodiment of the present invention, reference may be made to the related description of the corresponding user equipment in the embodiment shown in FIG. 3. Details are not described herein again.

To better implement the embodiments of the present invention, an embodiment of the present invention further provides a computer readable storage medium. The computer readable storage medium stores one or more computer programs, and the computer readable storage medium may be a magnetic disk, an optical disc, a ROM, a RAM, or the like. When the one or more computer programs run on one or more processors of user equipment, the process corresponding to the user equipment in the method embodiment shown in FIG. 3 can be implemented. When the one or more computer programs run on one or more processors of an access device, the process corresponding to the first access device in the method embodiment shown in FIG. 3 can be implemented.

In conclusion, according to the embodiments of the present invention, instead of sending the cell reselection information in a periodic broadcasting manner, the first access device sends the cell reselection information related to the first access device to the user equipment in the random access procedure, so that the user equipment can perform cell reselection in a subsequent procedure. This avoids causing unnecessary waste of system resources and saves an air interface transmission resource.

Although the present invention is described herein with reference to the embodiments, the protection scope of the claims of the present invention should not be limited by the description. In a process of implementing the present invention that claims protection, a person skilled in the art may understand and implement all or some procedures in the embodiments by viewing the accompanying drawings, the disclosed content, and the appended claims. Equivalent modifications made in accordance with the claims of the present invention shall fall within the scope of the present invention. In the claims, "comprising" does not exclude another component or another step, and "a" or "one" does not exclude a case of multiple. A single controller or another unit may implement several functions enumerated in the claims. The fact that some measures are recited in mutually different dependent claims does not indicate that a combination of these measures cannot bring better effects. The computer program may be stored/distributed in a proper medium, for example, an optical storage medium or a solid state medium, and is provided as or used as a part of hardware together with other hardware, or may use another distribution form, such as by using the Internet or another wired or wireless system.

What is claimed is:

1. A system message transmission method, the method comprising:
   receiving, by a mobile device, second system information broadcasted by an access device, wherein the second system information comprises information indicating to the mobile device to determine a specified time-frequency location of a random access preamble sequence;
   sending, by the mobile device, a random access message to the access device, wherein the random access message comprises a random access preamble message, the random access preamble message comprises the random access preamble sequence, and wherein carrying the random access preamble sequence on the specified time-frequency location indicates to the access device to send first system information to the mobile device; and
   receiving, by the mobile device, the first system information sent by the access device, wherein the first system information comprises cell reselection information related to the access device.

2. The method according to claim 1, wherein the second system information comprises the specified time-frequency location of the random access preamble sequence and cell access information corresponding to the access device, and wherein the second system information does not comprise the cell reselection information.

3. The method according to claim 1, wherein the random access message comprises identity information of a target cell related to the access device, and the cell reselection information related to the access device comprises cell reselection information corresponding to the target cell.

4. The method according to claim 1, wherein receiving the first system information comprises:
   receiving, by the mobile device, a random access response message that carries the first system information and that is sent by the access device.

5. The method according to claim 1, wherein the random access message comprises a radio resource control (RRC) connection request message; and
   wherein receiving the first system information comprises:
   receiving, by the mobile device, an RRC connection setup complete message that carries the first system information and that is sent by the access device.

6. An apparatus, applied to a mobile device, comprising:
   a non-transitory memory storage comprising instructions;
   a processor in communication with the non-transitory memory storage, wherein the processor executes the instructions causing the apparatus to perform operations comprising:
   receiving second system information broadcasted by an access device, wherein the second system information comprises information indicating to the apparatus to determine a specified time-frequency location of a random access preamble sequence;
   sending a random access message to the access device, wherein the random access message comprises a random access preamble message, the random access preamble message comprises the random access preamble sequence, and wherein carrying the random access preamble sequence on the specified time-frequency location indicates to the access device to send first system information to the mobile device; and
   receiving the first system information sent by the access device, wherein the first system information comprises cell reselection information related to the access device.

7. The apparatus according to claim 6, wherein the second system information comprises the specified time-frequency location of the random access preamble sequence and cell access information corresponding to the access device, and wherein the second system information does not comprise the cell reselection information.

8. The apparatus according to claim 6, wherein the random access message comprises identity information of a target cell related to the access device, and the cell reselection information related to the access device comprises cell reselection information corresponding to the target cell.

9. The apparatus according to claim 6, wherein the processor executes the instructions causing the apparatus to perform operations comprising:
   receiving a random access response message that carries the first system information and that is sent by the access device.

10. The apparatus according to claim 6, wherein:
    the random access message comprises a radio resource control (RRC) connection request message; and
    wherein the processor executing the instructions causes the apparatus to perform operations further comprising:
    receiving an RRC connection setup complete message that carries the first system information and that is sent by the access device.

11. A system message transmission method, the method comprising:
    broadcasting, by an access device, second system information to a mobile device, wherein the second system information comprises information indicating to the mobile device to determine a specified time-frequency location of a random access preamble sequence;
    receiving, by the access device, a random access message from the mobile device, wherein the random access message comprises a random access preamble message, the random access preamble message comprises the random access preamble sequence, and wherein the access device is indicated to send first system information to the mobile device based on the specified time-frequency location that carried the random access preamble sequence; and
    sending, by the access device, the first system information to the mobile device, wherein the first system information comprises cell reselection information related to the access device.

12. The method according to claim 11, wherein the second system information comprises the specified time-frequency location of the random access preamble sequence and cell access information corresponding to the access device, and wherein the second system information does not comprise the cell reselection information.

13. The method according to claim 11, wherein the random access message comprises identity information of a target cell related to the access device, and the cell reselection information related to the access device comprises cell reselection information corresponding to the target cell.

14. The method according to claim 11, wherein the random access message comprises a radio resource control (RRC) connection request message; and
    wherein sending the first system information comprises:

sending, by the access device, an RRC connection setup complete message carries the first system information to the mobile device.

15. An apparatus, applied to an access device, comprising:
a non-transitory memory storage comprising instructions;
a processor in communication with the non-transitory memory storage, wherein the processor executes the instructions causing the apparatus to perform operations comprising:
  broadcasting second system information to a mobile device, wherein the second system information comprises information indicating to the mobile device to determine a specified time-frequency location of a random access preamble sequence;
  receiving a random access message from the mobile device, wherein the random access message comprises a random access preamble message, the random access preamble message comprises the random access preamble sequence, and wherein the apparatus is indicated to send first system information to the mobile device based on the specified time-frequency location that carried the random access preamble sequence; and
  sending the first system information to the mobile device, wherein the first system information comprises cell reselection information related to the apparatus.

16. The apparatus according to claim 15, wherein the second system information comprises the specified time-frequency location of the random access preamble sequence and cell access information corresponding to the apparatus, and wherein the second system information does not comprise the cell reselection information.

17. The apparatus according to claim 15, wherein the random access message comprises identity information of a target cell related to the apparatus, and the cell reselection information related to the apparatus comprises cell reselection information corresponding to the target cell.

18. The apparatus according to claim 15, wherein the random access message comprises a radio resource control (RRC) connection request message; and wherein the processor executes the instructions causing the apparatus to perform operations comprising:
  sending an RRC connection setup complete message carries the first system information to the mobile device.

* * * * *